| United States Patent [19] | [11] 4,127,941 |
|---|---|
| Hoover | [45] Dec. 5, 1978 |

[54] MEANS AND GRAPHICAL METHOD OF CALCULATING MOMENTS OF INERTIA

[76] Inventor: Richard L. Hoover, Box DY 582 Cave Creek Stage, Phoenix, Ariz. 85020

[21] Appl. No.: 820,713

[22] Filed: Aug. 1, 1977

[51] Int. Cl.$^2$ .................. B43L 13/20; G01B 5/26; G09B 23/06

[52] U.S. Cl. .................................. 33/1 C; 33/121; 35/19 R

[58] Field of Search ............... 33/1 R, 1 B, 1 C, 121; 35/19 R

[56] References Cited

U.S. PATENT DOCUMENTS 2,535,208  12/1950  Hoover ........................ 35/19 R Primary Examiner—Richard E. Aegerter
Attorney, Agent, or Firm—Harry M. Weiss

[57] ABSTRACT

This disclosure relates to a means and graphical method of calculating Moments of Inertia which utilizes a specially designed graph paper that simplifies calculation of the Moment of Inertia of an irregular shaped area with respect to a fixed axis.

3 Claims, 5 Drawing Figures

MEANS AND GRAPHICAL METHOD OF CALCULATING MOMENTS OF INERTIA

BACKGROUND OF THE INVENTION

1. Field of the Invention

This invention relates generally to means and methods for determining Moments of Inertia and, more particularly, relates to means and graphical methods of calculating Moments of Inertia of an irregular shaped area with respect to a fixed axis using specially designed graph paper that enables one to distort the "irregular shaped area" in such a way that the "area of the distorted figure" equals in numerical value the Moment of Inertia of the original "irregular shaped area" about its selected axis of rotation.

2. Description of the Prior Art

One definition of the Moments of Inertia of an area is defined as the sum of the products of each small element of area multiplied by the square of each element's distance from the axis of rotation. The Moment of Inertia, which is generally represented by "I", varies directly as the area and as the square of the radius of gyration of the area.

Design engineers working in several high technology disciplines have a need to calculate the Moments of Inertia of a variety of irregularly shaped objects such as airfoils, ailerons, rudders and including various hydrodynamic as well as aerodynamic shapes. Algebraic expressions have been derived for computing the Moments of Inertia of common geometric figures such as rectangles and circles. For example, the Moment of Inertia of a rectangle about its base as a neutral axis is:

$bd^3/3$ where b is the width of the rectangle and d is its depth or height.

Very few practical Moments of Inertia problems can be solved with simple techniques or algebraic methods and it is usually necessary to perform intricate and drawn-out mathematical computations to arrive at an approximation of the Moments of Inertia of an irregularly shaped area or object about a fixed axis.

Several complicated mechanical integrating machines have been proposed in the prior art for measuring Moments of Inertia. Cost and/or application limitations have precluded widespread acceptance of these prior art devices.

U.S. Pat. No. 2,535,208 issued Dec. 26, 1950, to R. L. Hoover, the inventor of this application describes a sophisticated Moment of Inertia calculating device which uses 38 movable cards or paper sheets which are fitted into a metal frame. As stated above, the Moment of Inertia of a rectangle with its axis at the base is equal to $bd^3/3$.

Using the prior art Hoover Moment of Inertia calculator, an irregular or random area can be drawn on the exposed edges of the cards with the axis at the bottom edge. Inasmuch as the width b did not change and is therefore a constant, it was only necessary to convert or transform the height or depth of the area to $d^3/3$ by extending and retracting the cards to the limits of predetermined slots in each card. At the line of unit distance from the axis of interest, where d equals 1, $d^3/3$ equals ⅓ and for all distances from the axis, less than unity, $d^3/3$ becomes vanishingly small.

To determine the Moment of Inertia of the area drawn on the above cited Hoover calculator, it was only necessary to measure the outlined area of the modified shape with a standard planimeter. However, in practice, lost motion and cumulative clearances in the slots and side flanges proved to be a potential source of error in the Hoover Moment of Inertia calculator.

Accordingly, a need existed for a straightforward simple and more precise means and method of computing Moments of Inertia.

Figure 1:
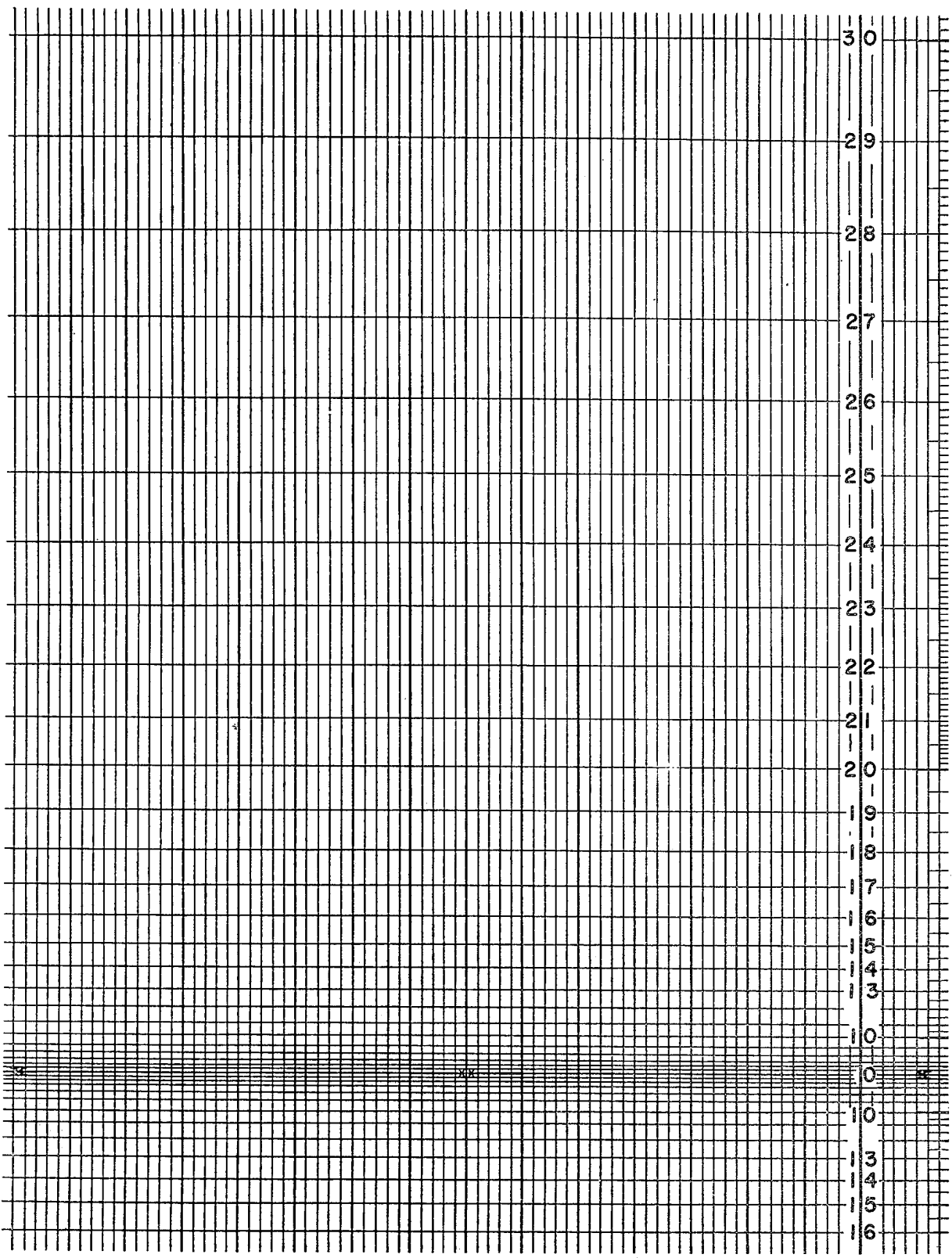
FIG. 1 is a plan view of a graph type paper for use, in accordance with this invention, for determining Moments of Inertia of an irregular shaped body or area about a fixed axis.

Referring to the graph type paper shown in FIG. 1, it will be noted that preferably 16 vertical lines are used and are equally spaced at 0.5 inches with four subordinate lines between the 0.5 inch lines, spaced at 0.1 inch intervals. The neutral axis or axis of rotation is shown 1½ inches from the bottom of the graph type paper and is marked X xx X.

Horizontal lines are located on the graph type paper (preferably 26 lines above the axis and 12 lines below) and these lines are spaced in accordance with the relationship $d^3/3$ where d is preferably in inches. One half inch is the smallest increment of d shown on the graph type paper of FIG. 1 where d is any point on the outer boundary of the irregular shaped area of interest for which the Moment of Inertia is to be calculated. This one half inch value for d corresponds to a point on the first horizontal line either above or below the axis which line is equal to 0.0416 (or $d^3/3$) inches from the axis. The very top horizontal line of the graph type paper of FIG. 1 has a value of d equal to 3 inches, therefore, $d^3/3$ equals 9 inches. All other horizontal lines are spaced on the same basis where d equals $d^3/3$. The last major vertical line on the right side of the graph type paper of FIG. 1 has a vertical column of numbers from d equals 0.5 inches to d equals 3.0 inches extending upward from the axis and from d equals 0.5 inches to d equals 1.6 inches extending downward from the axis. The last major vertical line on the right side of the graph type paper of FIG. 1 separates the vertical column of numbers which identifies all of the horizontal lines except those horizontal lines on each side of the axis between 0.6 and 0.9. The last major vertical line on the right side of the graph type paper also serves as a decimal divider for horizontal line designators from 1.0 to 3.0 in the upward direction and from 1.0 to 1.6 in the downward direction. The number 5 which is nearest to the axis on both sides thereof should be read as 0.5.

The other equally spaced vertical lines on the graph type paper of FIG. 1 which can be called I (or Inertia) paper serves to simplify the projection of d (in inches) of the surface undergoing calculation, upward or downward to equal $d^3/3$ as required to modify the outline or shape to equal the Moment of Inertia.

The area of the corresponding projected area that is projected from the actual outline of the initial irregular shaped area of interest in inches, either using its actual size or, if necessary, a scaled down (or scaled up) version of the initial area of interest can be measured with a standard planimeter by preferably runing the planimeter around the boundary of the projected figure or, if desired, by tracing the modified shape on square graph type paper either in millimeters or one eighth inch squares and then counting the squares within the boundary of the modified projected shape. In scaling up or down, the reading is multiplied by a conversion factor.

OPERATIONAL EXAMPLES

Figures 2A, 2B:
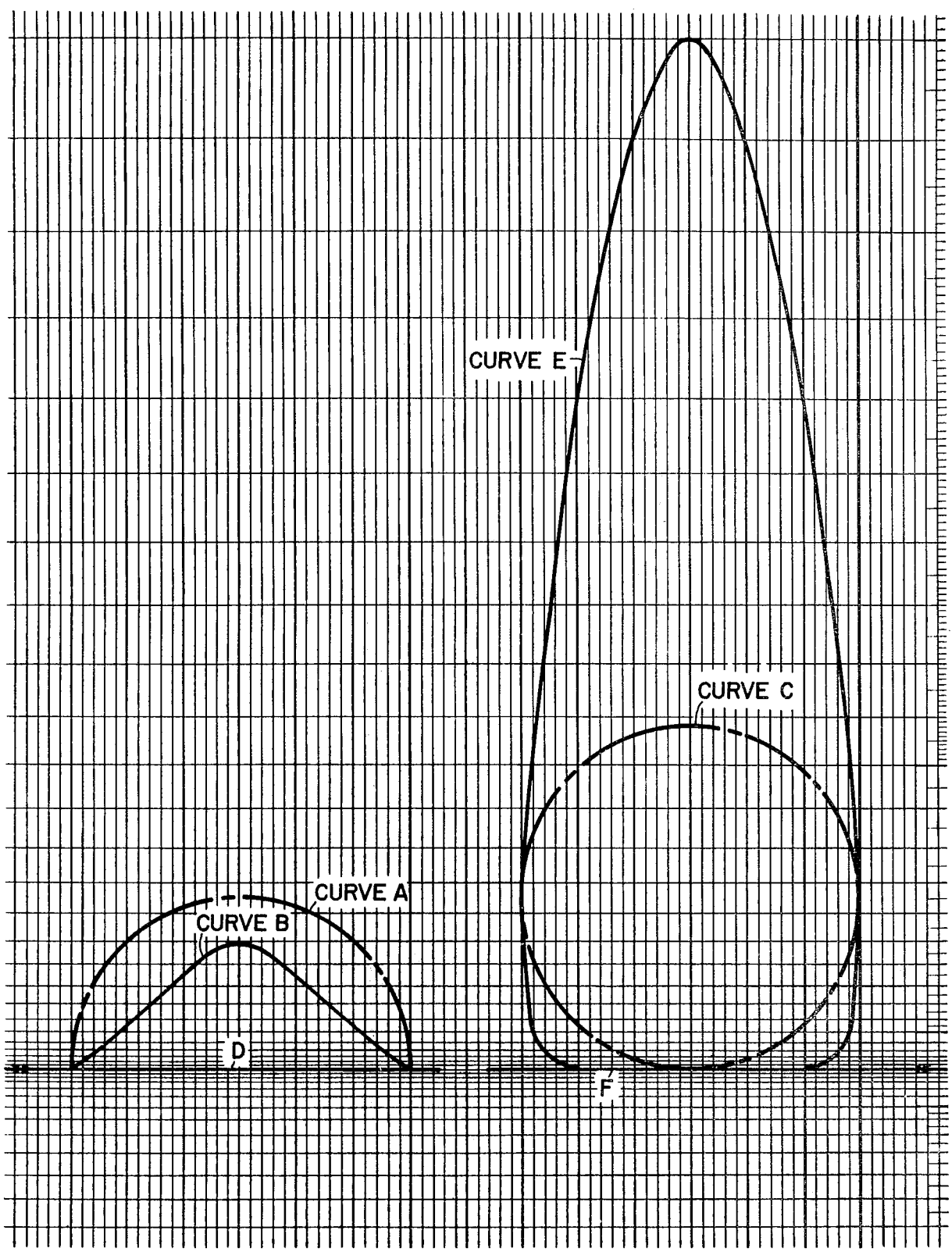
FIG. 2A is an example of how to determine the Moment of Inertia of a semicircle about an axis located on its diameter.
FIG. 2B is an example of how to determine the Moment of Inertia of a circle about an axis tangential to the circle.

FIGS. 2A and 2B show two examples of Moment of Inertia curves generated from two fairly common geometric shapes using the graph type paper of FIG. 1. One Moment of Inertia curve is plotted from a semi-circle, Curve A, with a diameter of 3 inches (7.6 cms) with the neutral axis or axis of interest or rotation located along the shown diameter D of the semi-circle which is along the axis of the graph type paper of FIG. 1. Curve B represents the Moment of Inertia generated from Curve A where each of the points on Curve A has a corresponding point on Curve B. The corresponding points on Curve B are derived using the I graph type paper of FIG. 1 as described above. The area under Curve B is 11.5 cm$^2$ which equals the Moment of Inertia of Curve A. The area of the semi-circle, Curve A, is 22.5 cm$^2$.

Curve C is plotted from a 3 inch (7.6 cm) diameter full circle with an area of 44 cm$^2$ and the neutral axis or axis of rotation being on the tangent of the Circle F. The area under the Curve E as derived from Curve C is equal to 215 cm$^2$ (see FIG. 2B).

On the outermost right side edge portion of FIG. 1 and FIGS. 2A and 2B is a scale divided into tenths above the I value of 2.0 and into halves between the I value of 1 and 2.0 above the axis and between 1 and 1.6 below the axis. This is useful in executing the projection (for Curves B and E) of the value I in inches to I or d$^3$/3 from the surface (of Curves A or C) for which the Moment of Inertia is to be calculated. The largest value of d which can be projected as I on the graph type paper shown in FIGS. 1, 2A and 2B and 3B is a d value of 3 inches which equals an I value of 3 or 9 inches.

A general observation which may be made from the two examples shown in FIGS. 2A and 2B is that with maximum d values of 1.5 inches or less on a given curve such as Curve A, the Moment of Inertia will be from approximately one half to much less than one half of the area of the given curve (Curve A), whereas with d values greater than two (see Curve C), the Moment of Inertia will exceed the area of the underlying curve (Curve C), reaching a value in excess of four times the area of the given curve where d equals 3 inches.

Areas of Curves A, B, C and E of FIGS. 2A and 2B are shown in metric units as well as in inches. Millimeter squared paper can be used to estimate the Moments of Inertia (Curves B and E) in square centimeters whereas one eighth inch square paper can be used to express the Moments of Inertia (Curves B and E) in square inches. Preferably, a planimeter is used as described above to rapidly determine the Moments of Inertia from Curves B and E. If desired, an alternative version of graph type paper based on metric units can be utilized. This is because metric units and all subdivisions thereof are based on decimal fractions which would simplify the projection of "d"s to "I"s in the figures of interest and also in the scaling up or scaling down of figures of interest to fit into the dimensional framework of the I Paper.

Figure 3A:
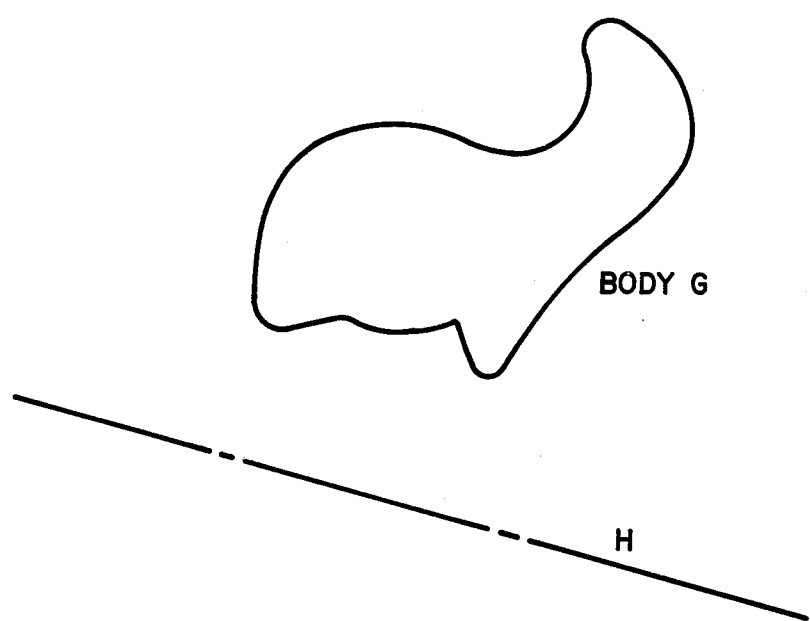
FIG. 3A is a diagramatic view of an irregular shaped area and an axis about which the Moment of Inertia of the irregular shaped area is to be taken.
Figure 3B:
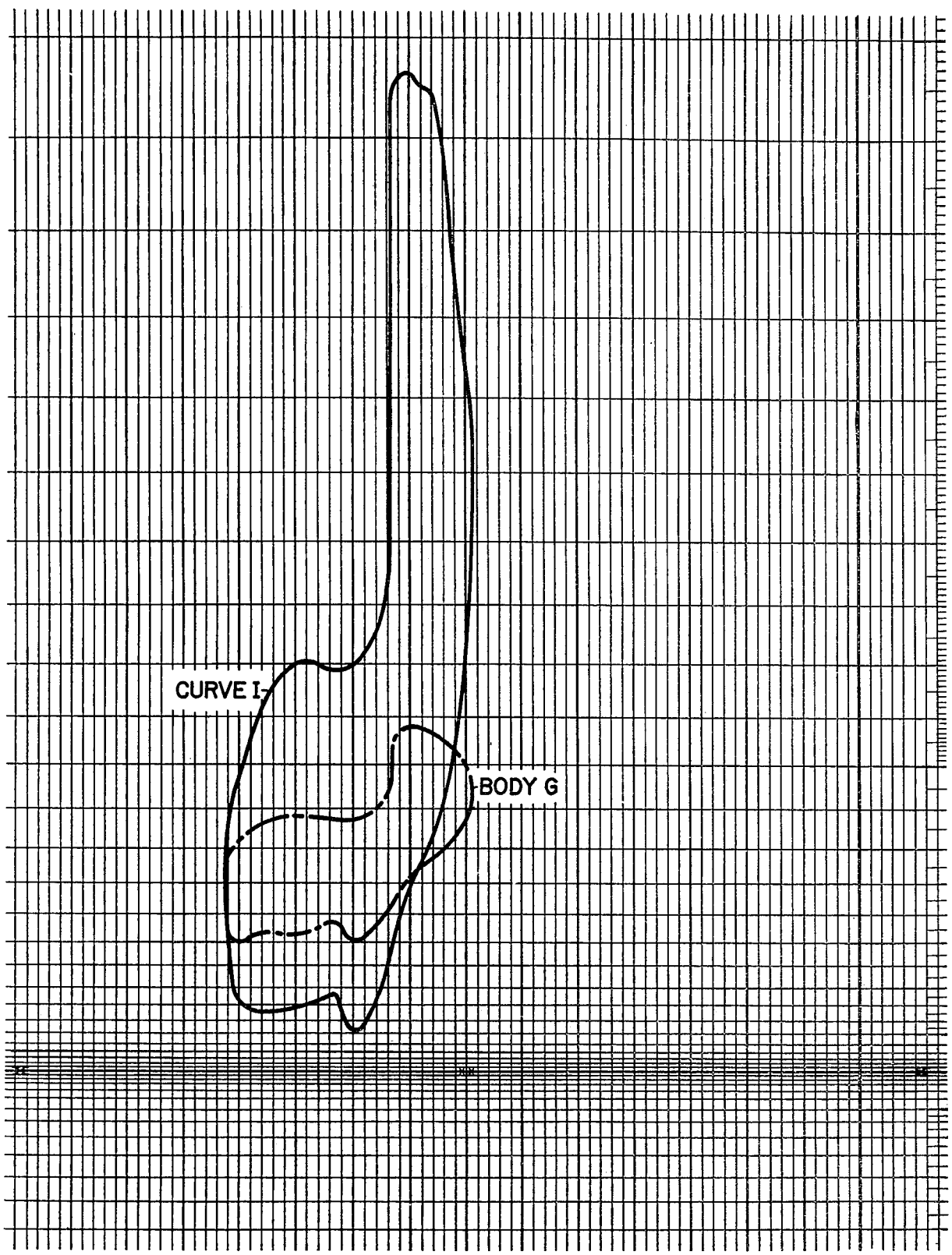
FIG. 3B is the resultant area equivalent to the value of the Moment of Inertia that is achieved using the graph type paper of FIG. 1 showing in phantom the original irregular shaped area.

FIG. 3A shows an irregular shaped Area G which is a given body for which the Moment of Inertia is to be calculated taken about an axis H. FIG. 3B shows the projection of the irregular shaped Area G (shown in phantom lines) in the graph type paper of FIG. 1 together with the projected Moment of Inertia Curve I which is derived therefrom as described above.

While this invention has been described in reference to the preferred embodiment thereof, it will be understood by those skilled in the art that changes in the form and details may be made therein without departing from the spirit and scope of the invention.

What is claimed is:

1. A method for determining the Moment of Inertia of a plane surface of interest about an axis of rotation comprising the steps of projecting an area proportional to said plane surface of interest on a specially designed graph paper having an axis and having parallel lines that are proportional to d$^3$/3 where d is the distance from any given point on said plane surface of interest to its axis of rotation, generating a corresponding plane surface on said specially designed graph paper using said projected plane surface of interest and having every point on said corresponding plane surface being equal to d$^3$/3 as compared to the corresponding point on said projected plane surface of interest, and calculating the area under said corresponding plane surface which is proportionally equal to the Moment of Inertia of said plane surface of interest.

2. A method in accordance with claim 1 including utilizing a planimeter for calculating the area under said corresponding plane surface to provide the Moment of Inertia of said plane surface of interest.

3. A method in accordance with claim 1 including the step of providing said parallel lines above said axis of said specifically designed graph paper having a d$^3$/3 value of from 0.5 to 3.0, providing said parallel lines below said axis of said specially designed graph paper having a d$^3$/3 value of from 0.5 to 1.6.

* * * * *